US012617467B2

(12) United States Patent
Ankanahalli Ramegowda et al.

(10) Patent No.: US 12,617,467 B2
(45) Date of Patent: May 5, 2026

(54) TRANSVERSE CROSS-MEMBER ASSEMBLY AND MOUNTING METHODS FOR A VEHICLE CHASSIS

(71) Applicant: Volvo Truck Corporation, Gothenburg (SE)

(72) Inventors: Rasanjaya Ankanahalli Ramegowda, Karnataka (IN); Rajendra Chamarajanagar Rajanna, Karnataka (IN); Shree Harsha Akkur Ramabhadraiah, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/943,091

(22) Filed: Nov. 11, 2024

(65) Prior Publication Data

US 2025/0162650 A1      May 22, 2025

(30) Foreign Application Priority Data

Nov. 17, 2023      (EP) .................................... 23210708

(51) Int. Cl.
B62D 21/02 (2006.01)
(52) U.S. Cl.
CPC .................................... B62D 21/02 (2013.01)
(58) Field of Classification Search
CPC ........ B62D 21/00; B62D 21/02; B62D 21/08; B62D 21/12; B62D 27/065; B62D 21/03;
(Continued)

(56) References Cited

U.S. PATENT DOCUMENTS 6,561,574 B1 *   5/2003   Logan ....................... E04C 3/08
                                                          296/204
11,254,367 B2 *   2/2022   Stojkovic ............... B62D 25/08
                         (Continued)

FOREIGN PATENT DOCUMENTS

CN          203958305 U   * 11/2014
CN          109018002 A   * 12/2018   ............. B62D 21/02
                         (Continued)

OTHER PUBLICATIONS

Martin, WO-2004062984-A1, Machine Translation of Specification (Year: 2004).*

(Continued)

*Primary Examiner* — Jason D Shanske
*Assistant Examiner* — Matthew Joseph Ganci
(74) *Attorney, Agent, or Firm* — Withrow & Terranova, PLLC

(57)          ABSTRACT

A transverse cross-member beam for a vehicle chassis, comprising a first and a second beam half, each beam half having an external extremity for connection a longitudinal frame member, and each beam half having an internal extremity; wherein the internal extremity of each beam half has a mating surface configured for mating to the mating surface of the other beam half at one of at least two distinct relative positions separated along a horizontal transverse axis, with fixation features; and wherein the internal extremity of each beam half has a first abutment portion configured for abutment against a second abutment portion of the other beam half, configured to block relative movement of each beam half internal extremity relative to the external extremity of the beam half.

18 Claims, 5 Drawing Sheets

(58) Field of Classification Search
CPC .... B62D 25/145; B62D 29/041; B62D 27/06; B60D 1/48; B60D 1/52
See application file for complete search history.

(56) References Cited

U.S. PATENT DOCUMENTS

| 2006/0131932 | A1 | | 6/2006 | Kiselis et al. | |
|---|---|---|---|---|---|
| 2022/0111897 | A1 | * | 4/2022 | Kelk | B62D 27/065 |
| 2022/0153349 | A1 | | 5/2022 | Kimoto et al. | |

FOREIGN PATENT DOCUMENTS

| CN | 116409386 | A | * | 7/2023 | | B62D 21/02 |
|---|---|---|---|---|---|---|
| DE | 102012015246 | A1 | | 12/2013 | | |
| DE | 102014221743 | A1 | | 4/2016 | | |
| EP | 2336004 | A1 | * | 6/2011 | | B62D 21/02 |
| EP | 2669100 | A2 | | 12/2013 | | |
| JP | 4016376 | B2 | * | 12/2007 | | B62D 21/02 |
| JP | 2009248583 | A | | 10/2009 | | |
| KR | 100969008 | B1 | | 7/2010 | | |
| WO | WO-2004062984 | A1 | * | 7/2004 | | B62D 21/02 |
| WO | WO-2010030257 | A1 | * | 3/2010 | | B62D 21/12 |
| WO | 2022133260 | A1 | | 6/2022 | | |

OTHER PUBLICATIONS

Ito, JP-4016376-B2, Machine Translation of Specification (Year: 2007).*

Li, CN 109018002 A, Machine Translation of Specification (Year: 2018).*

Li, CN-203958305-U, Machine Translation of Specification (Year: 2014).*

Zeng, CN-116409386-A, Machine Translation of Specification (Year: 2023).*

European Search Report for European Patent Application No. 23210708.6, completed May 1, 2024, 7 pages.

* cited by examiner

Fig. 1
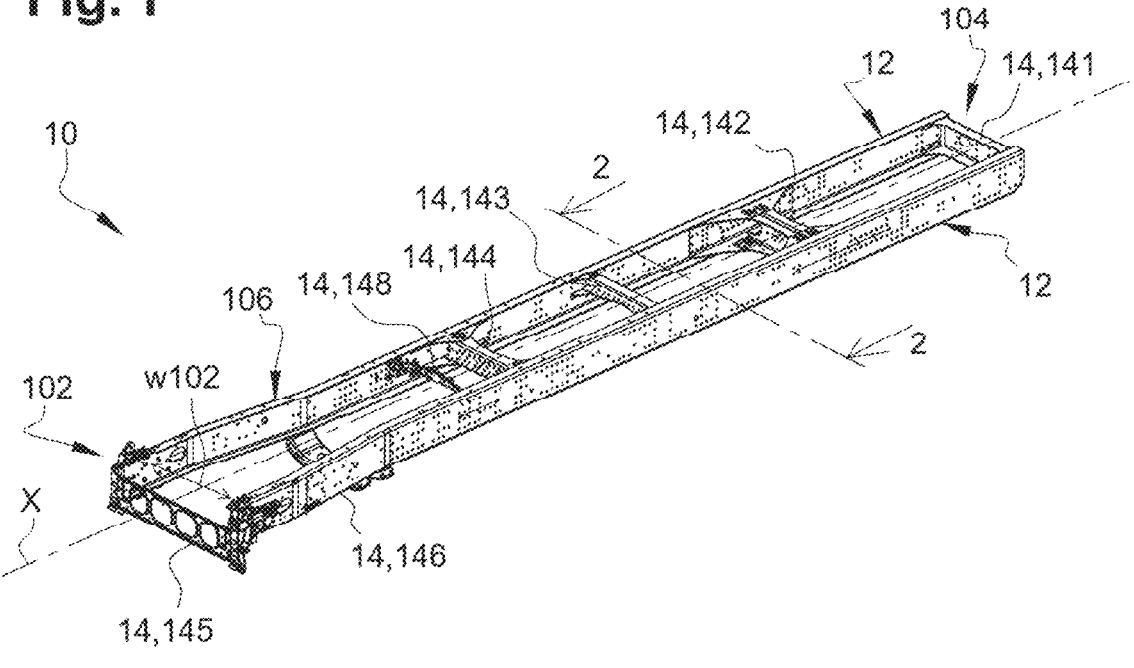
Fig. 2
Fig. 3
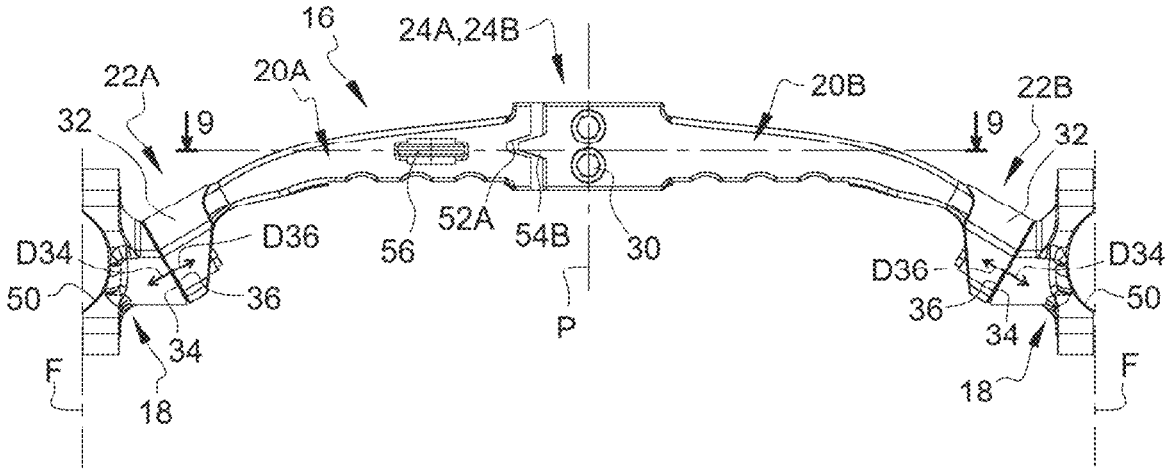

TRANSVERSE CROSS-MEMBER ASSEMBLY AND MOUNTING METHODS FOR A VEHICLE CHASSIS

PRIORITY APPLICATIONS

The present application claims priority to European Patent Application No. 23210708.6, filed on Nov. 17, 2023, and entitled "TRANSVERSE CROSS-MEMBER ASSEMBLY AND MOUNTING METHODS FOR A VEHICLE CHASSIS," which is incorporated herein by reference in its entirety.

TECHNICAL FIELD

The disclosure relates generally to a vehicle chassis. In particular aspects, the disclosure relates to a transverse cross-member assembly to be mounted between two longitudinal and horizontal frame members of a vehicle chassis, to a transverse cross-member beam for such transverse cross-member assembly, to a mounting bracket for mounting a transverse cross-member beam between two longitudinal and horizontal frame members of a vehicle chassis, and to a vehicle having any of such devices. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

According to a known design for a vehicle chassis, the chassis comprises two longitudinal frame members that are connected one to the other by transverse cross-members. The chassis assembly is usually one of the first steps of a vehicle assembly process. A chassis assembly usually includes, as one of the first steps, steps of connecting the two longitudinal frame members by transverse cross-members, at least two transverse cross-members. In some cases, one or several cross-members can be assembled into the chassis after some other components of the vehicle have been assembled to the chassis. In any case, there is a strong interest in designing the chassis of the vehicle so that its assembly is as easy as possible, including when it comes to the specific case of the assembly of a transverse cross-member into the chassis. Simplicity of the assembly process for a cross-member is specifically important, and more difficult to achieve, for a cross-member that is assembled into the chassis after other components have already been installed, because access to the cross-member location on the chassis may be partially obstructed by previously mounted vehicle components.

SUMMARY

According to a first aspect of the disclosure, it is disclosed a transverse cross-member beam for mounting between two longitudinal and horizontal frame members of a vehicle chassis, comprising a first beam half and a second beam half, each beam half having an external extremity configured for connection respectively to a first and to a second of the two longitudinal frame members, and each beam half having an internal extremity configured for connection to the internal extremity of the other beam half.

The internal extremity of each beam half has a mating surface configured for mating to the mating surface of the other beam half at one of at least two distinct relative positions separated along a horizontal transverse axis, the mating surfaces of both beam halves having each at least one fixation feature for fixation of the mating surface to the mating surface of the other beam half.

The internal extremity of each beam half has a first abutment portion configured for abutment against a second abutment portion of the other beam half, the first and second abutment portions being configured to block relative movement of each beam half internal extremity relative to the external extremity of the beam half to which said beam half internal extremity pertains.

The first aspect of the disclosure may seek to ease the mounting of the transverse cross-member beam. A technical benefit may include that the transverse cross-member beam can accommodate to any frame width tolerance between the longitudinal frame members, and/or accommodate to the presence or absence of a liner in longitudinal frame members. A technical benefit may further include providing a temporary holding feature of the beam halves during assembly, giving an operator or a machine more freedom to perform further acts of assembly such as a fastening together of the two beam halves.

Optionally in some examples, including in at least one preferred example, the first abutment portion of one beam half and the second abutment portion of the other beam half may have a corresponding male/female geometry, and wherein the male geometry may be configured to be received within the female geometry. A technical benefit may include a reliable abutment of the beam halves during assembly, for example before fastening of beam halves together.

Optionally in some examples, including in at least one preferred example, the male/female geometries of the first abutment portion of one beam half and the second abutment portion of the other beam half may be configured to allow introduction of the male geometry into the female geometry along a longitudinal direction. A technical benefit may include better case to perform such introduction when transversal movement of beam halves may be constrained by the available width between the longitudinal frame members.

Optionally in some examples, including in at least one preferred example, the male geometry of the abutment portion of one beam half may comprise a V shaped extension of the internal extremity of the beam half, the V-shape extending in a vertical transverse plane and pointing in a transverse internal direction with respect to that beam half, and the female geometry of the abutment portion of the other beam half may comprise a corresponding V-shaped recess of the internal extremity of the beam half, the V-shape extending in a vertical transverse plane and pointing in a transverse external direction with respect to that other beam half, and the V-shaped recess being open on one side along the longitudinal axis and being open transversely at its base side along a transverse internal axis with respect to that other beam half. A technical benefit may include a self-centering effect of the abutment portions, and/or a better stability of the abutment, for example before fastening of beam halves together.

Optionally in some examples, including in at least one preferred example, the mating surfaces of each beam half may be configured to overlap each other when viewed along a longitudinal axis. A technical benefit may include an increases stability of the abutment, especially in the longitudinal direction, for example before fastening of beam halves together.

Optionally in some examples, including in at least one preferred example, the mating surface of each beam half may be configured to extend along a vertical and transverse plane. A technical benefit may include contributing to a facilitation of the adjustment of the relative transverse positions of the beam halves, for example before fastening of beam halves together.

Optionally in some examples, including in at least one preferred example, the beam may form an arch, where the external extremity of each beam half is located vertically lower than the internal extremity of each beam half. A technical benefit may include a better stability of the abutment for example before fastening of beam halves together, by the arch effect.

Optionally in some examples, including in at least one preferred example, the first and second beam halves may be identical and may be assembled opposite one to the other to form the cross-member beam. A technical benefit may include reducing the number of different parts to be provided.

Optionally in some examples, including in at least one preferred example, the first and second beam halves may be made of aluminum or aluminum. A technical benefit may include a reduced weight, and/or case of manufacture, for example by molding.

Optionally in some examples, including in at least one preferred example, the first and second beam halves may be made of molded metal. A technical benefit may include a greater case of manufacture, possibly at a lower cost, with a possibility to integrate further functional features on the beam, such as an accessory component support.

Optionally in some examples, including in at least one preferred example, at least one of the first and second beam halves may comprise an integrally molded accessory component support or fixation member. A technical benefit may include a reduced cost for integrating a further function on the beam.

Optionally in some examples, including in at least one preferred example, each beam half external extremity may be configured for connection to the corresponding longitudinal frame member via a mounting bracket. A technical benefit may include to reduce the weight of each component, and/or to have the possibility have different beam designs mounted with the same mounting brackets, and/or to have the possibility of having a same beam design mounted with the different mounting brackets, for example to accommodate for different designs of the ladder frame with a minimum number of different parts.

Optionally in some examples, including in at least one preferred example, the external extremity of each beam half may have a bracket interface portion having at least one downwardly oriented bracket contact surface defining a downward bracket contact direction, the downward bracket contact direction being downwardly oriented in a vertical and transverse plane. A technical benefit may include better resistance to downwardly oriented forces, and/or increased stability during mounting, for example before fastening of beam halves together.

Optionally in some examples, including in at least one preferred example, the first and second abutment portions may be configured to block relative movement of each beam half internal extremity with respect to the bracket contact surface of the external extremity of the beam half to which said beam half internal extremity pertains. A technical benefit may include increased stability of the abutment during mounting, for example before fastening of beam halves together.

Optionally in some examples, including in at least one preferred example, the at least one downwardly oriented bracket contact surface may be located adjacent or around a fixation feature of the external extremity of the beam half. A technical benefit may include a reduction of parasitic bending forces on the fixation feature.

According to a second aspect of the disclosure, it is disclosed a mounting bracket for mounting a transverse cross-member beam between two longitudinal and horizontal frame members of a vehicle chassis, comprising:

a frame interface portion having at least three non-aligned frame contact locations which are configured for contacting one of the two frame members and which each comprise a distinct frame fixation feature, and wherein the frame contact locations define a vertical and longitudinal frame contact plane perpendicular to a horizontal transverse axis;

a beam interface portion having at least one upwardly oriented beam contact surface, configured for contacting one extremity of the transverse cross-member beam, and defining an upward beam contact direction, and wherein the upward beam contact direction is upwardly oriented in a vertical and transverse plane. The second aspect of the disclosure may seek to simplify the assembly process for a cross-member. A technical benefit may include increased stability during mounting of the beam, and/or better resistance to downwardly oriented forces applied on the beam.

Optionally in some examples, including in at least one preferred example, the at least one upwardly oriented beam contact surface may be located adjacent or around a beam fixation feature. A technical benefit may include a reduction of parasitic bending forces on the fixation feature.

Optionally in some examples, including in at least one preferred example, the beam interface portion may comprise at least one beam positioning feature. A technical benefit may include case and precision of the assembly process for a cross-member.

Optionally in some examples, including in at least one preferred example, the beam positioning feature may a beam positioning and fixation feature, for example a threaded stud. A technical benefit may include of reduced cost.

Optionally in some examples, including in at least one preferred example, the frame interface portion may have a concave longitudinal recess in its external surface turned towards the longitudinal frame member on which the mounting bracket is to be affixed, the concave longitudinal recess being open in the frame contact plane and extending longitudinally so as to be open at the longitudinal extremities of the mounting bracket. A technical benefit may include the formation of a routing tunnel for routing electrical wires, communication lines and/or fluid pipes through this tunnel.

Optionally in some examples, including in at least one preferred example, the frame interface portion may four non-aligned and separate frame contact locations which are configured for contacting one of the two longitudinal frame members and which each comprise a distinct frame fixation feature, the four separate frame contact locations forming each end of one of four separate legs of the frame interface portion. A technical benefit may include forming a stable interface between the cross-member and the longitudinal frame members, including in case of some geometrical defect (warping, bending, . . . ) of the longitudinal frame members.

Optionally in some examples, including in at least one preferred example, the mounting bracket may be made of molded metal. A technical benefit may include may include a greater case of manufacture, especially in view of a complex geometry.

Optionally in some examples, including in at least one preferred example, the mounting bracket may be made of aluminum or aluminum alloy. A technical benefit may include reduced weight and the possibility of using forming techniques such as molding.

According to a third aspect of the disclosure, it is disclosed a transverse cross-member assembly comprising a transverse cross-member beam according to any of examples abode and two mounting brackets according to any one of the examples above, wherein the two mounting brackets are configured for being fixed each by their beam interface portion to the external extremity of one of the two beam halves, with the corresponding above mentioned technical benefits.

According to a fourth aspect of the disclosure, it is disclosed a vehicle comprising a chassis having two longitudinal and horizontal frame members, the vehicle further comprising a transverse cross-member beam according to any one of the examples above and two mounting brackets according to any one of the examples above and/or comprising a transverse cross-member assembly as above, with the corresponding above mentioned technical benefits.

According to a fifth aspect of the disclosure, it is disclosed a method for mounting of a transverse cross-member assembly according any one of the examples above into a ladder frame, comprising:

a first phase which includes, in whichever order:
  mounting a first mounting bracket on a first longitudinal frame member;
  mounting a first beam half on the first mounting bracket;
  mounting the second mounting bracket on the second longitudinal frame member;
a second phase, posterior to the first phase, which includes, in whichever order:
  positioning the second beam half external extremity on the second mounting bracket;
  positioning the second beam half internal extremity in contact with the internal extremity of the first beam half in such a way that the first abutment portion of one of the beam halves abuts against the second abutment portion of the other beam half;
a third phase, posterior to the second phase, which includes, in whichever order:
  fastening the second beam half external extremity on the second mounting bracket;
  fastening the second beam half internal extremity with the internal extremity of the first beam half.

The fifth aspect of the disclosure may seek to simplify the assembly process for a cross-member. A technical benefit may include providing a temporary holding feature of the beam halves during assembly, giving an operator or a machine more freedom to perform further acts of assembly such as a fastening together of the two beam halves.

According to a sixth aspect of the disclosure, it is disclosed a method for assembling a vehicle, comprising:

connecting two longitudinal frame members by at least two primary transverse cross-members to form a ladder frame of the vehicle;

mounting one or several vehicle components selected in the list of powertrain components, and/or driveline components, and/or suspension components and/or steering components onto the ladder frame;

subsequently to the mounting of one or several vehicle components, mounting a transverse cross-member assembly according to any one of the examples above into the ladder frame, with the corresponding above mentioned technical benefits.

Optionally in some examples, including in at least one preferred example, the mounting of a transverse cross-member assembly into the ladder frame may be performed according to the method to the fifth aspect of the disclosure, with the corresponding above mentioned technical benefits.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

FIG. 1 is a perspective view of an exemplary ladder frame for a chassis of a vehicle such as a truck, according to an example.

FIG. 2 is a cross section of the ladder frame according to FIG. 1, along line 2-2 of FIG. 1.

FIG. 3 is a rear view of a transverse cross-member according to an example.

DETAILED DESCRIPTION

The detailed description set forth below provides information and examples of the disclosed technology with sufficient detail to enable those skilled in the art to practice the disclosure.

FIG. 1 illustrated exemplary ladder frame 10 for a chassis of a vehicle, typically a heavy-duty vehicle such as a truck.

Figure 11:
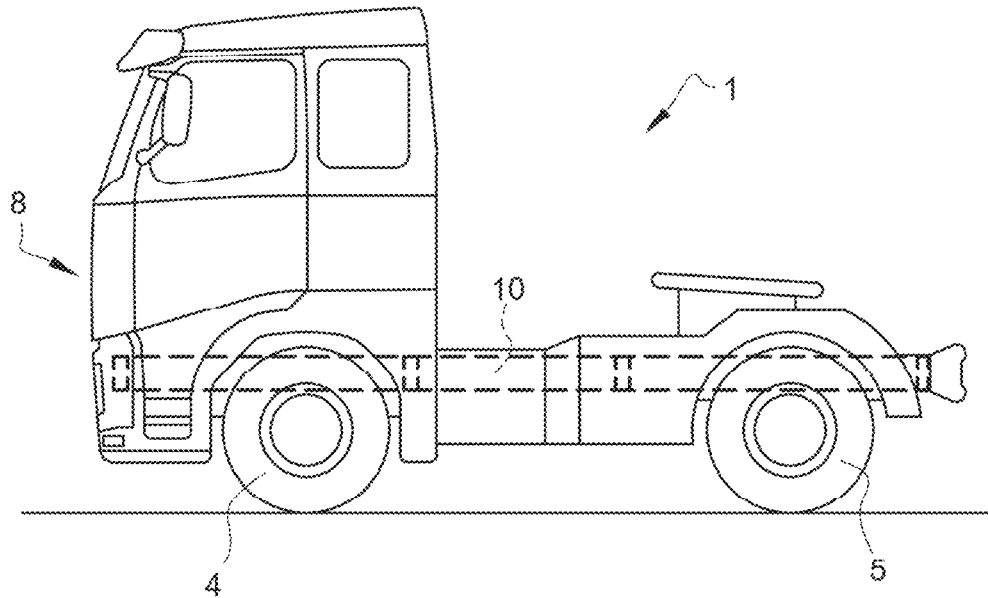
FIG. 11 is schematic side-view of an exemplary vehicle having a ladder frame.

FIG. 11 illustrates an exemplary automotive vehicle 1 that may be equipped with a ladder frame 10 as described in detail below. The vehicle may be a heavy-duty truck 1. More particularly, the vehicle may be a tractor 1 of a semi-trailer truck, thus designed to be coupled to a semi-trailer (not shown). However, the vehicle could be any other type of truck, including a rigid truck, or could be, more generally, any other type of heavy-duty vehicle, such as a bus or construction equipment such as excavators, loaders, back-hoes, backhoe-loaders, graders, dump-trucks, bulldozers, asphalt-pavers, compactors, tele-handlers, etc. . . . . The tractor 1 may typically comprise a chassis having the ladder frame 10, a front axle 4 and at least one rear axle 5, and a passenger cabin 8 for accommodating a driver of the vehicle. Typically, whether on a tractor or a rigid truck, the cabin 8 is installed on a front part of the ladder frame 10, the ladder frame 10 extending rearwardly beyond the rear extremity of the cabin 8.

As visible of FIG. 1, the ladder frame 10 comprises two longitudinal frame members 12, which are the two main longitudinal frame members of the ladder frame. The two longitudinal frame members 12 are elongated along an axis, which defines the longitudinal axis, X of the vehicle. Along the longitudinal axis X, the ladder frame 10 may exhibit a front portion 102 and a rear portion 104, the terms front and rear referring to the main direction of travel of the vehicle along the longitudinal axis X. When considering the main direction of travel of the vehicle, one may thus define the two longitudinal frame members 12 as comprising a left longitudinal frame member 12 and a right longitudinal frame member 12. The longitudinal axis X of elongation of the two longitudinal frame members 12 will also be considered herein as being parallel to the horizontal axis with respect to gravity, as this is a common feature of such frame members in a vehicle, when the vehicle rests on a horizontal surface. However, the terms horizontal, vertical, lower, upper, lower, top, bottom, etc. . . . are only used herein in relation one to the other without limiting the scope of the invention to a particular orientation of the ladder frame 10 or chassis with respect to gravity.

Each of the two longitudinal frame members 12 is typi-cally made of steel. Each of the two longitudinal frame members 12 typically exhibits a so-called C-shape in cross section, which is shown in more detail in FIG. 2 and in FIG. 7; with a main wall 122 extending along a vertical and longitudinal plane F, thus having a length along the longi-tudinal axis X and a height along the vertical axis Z, and with a top flange 124 and bottom flange 126 that extend in a horizontal plane from respectively a top and a bottom edge of the main wall 122. The top and bottom flanges 124, 126 extend along the length of the frame member 12, and exhibit a width along a transverse axis Y perpendicular to the longitudinal axis X in the horizontal plane. The width of top and bottom flanges 124, 126 may be equal or different, and is typically comprised within the range of 0.1 to 0.5 times the height of the main wall 122. The height of the main wall is, for example, comprised in the range from 10 centimeters to 40 centimeters. Each of the two longitudinal frame member 12 is usually made of sheet metal, folded to its C-shape, the sheet metal having typically a thickness which is for example in the range of 3 millimeters to 20 millime-ters. Each of the two longitudinal frame members 12 is commonly equipped with through holes 128 which are perforated across the thickness of the main wall, and pos-sibly also across the top and/or bottom flanges. The holes 128 may be used for fixing various components on the longitudinal frame members 12, for example with the use of bolts or rivets engaged through the holes 128.

Each of the two longitudinal frame members 12 may comprise a non-illustrated reinforcement member, which is called a liner. A liner is for example a sheet metal wall which is assembled, for example by bolting, riveting, gluing or welding, on the internal side of the main wall 122 of the longitudinal frame member 12, i.e. on the side of said wall which is facing the other longitudinal frame member 12. Such a sheet-metal wall may for example have a height comprised within the range from 0.5 to 0.99 times the height of the main wall 122, preferably comprised within the range from 0.7 to 0.95 times the height of the main wall 122. The liner may additionally comprise top and bottom flanges so as to have a C-shaped cross-section contained within the C-shaped cross-section of the longitudinal frame member 12. A liner may extend along the whole length of the longitudinal frame member 12, or along only part of the length of longitudinal frame member 12, preferably at a portion of the ladder frame 10 that experiences the highest mechanical stresses.

The two longitudinal frame members 12 are transversally separated by a transverse frame width measured between the internally facing surfaces of the main wall of each frame member 12, which is for example comprised within the range from 50 centimeter to 120 centimeters. Although the two longitudinal frame members 12 are substantially parallel one to the other, the transverse frame width between the two longitudinal frame members 12 may vary along the length of the ladder frame 10. For example, as shown in FIG. 1, the ladder frame 10 may exhibit a front portion 102 along which the two longitudinal frame members 12 are parallel and transversally separated by a front frame width W102, and a rear portion 104 along which the two longitudinal frame members 12 are parallel and transversally separated by a rear frame width W104. In some examples, the front frame width W102 is wider than the rear frame width W104. For example, the front portion 102 of the ladder frame 10 may accommodate at least part of a powertrain for the vehicle, for example, a powertrain cooling unit and/or an internal com-bustion engine, while the rear portion 104 may correspond to the load carrying section of the vehicle. A transition portion 106 is then provided between the front portion 102 and the rear portion 104, in which the two longitudinal frame members 12 are slightly angled with respect to one other to accommodate for the transition from the front frame width W102 to the rear frame width W104. At a portion of the ladder frame 10 where the longitudinal frame members 12 comprise a liner as reinforcement member, the frame width is reduced by approximately the thickness of the liners.

The two longitudinal frame members 12 are symmetri-cally arranged on both sides of a central longitudinal and vertical plane P. In many examples, the C-shape sections of the two longitudinal frame members 12 are thus also arranged symmetrically with respect to the central longitu-dinal and vertical plane P, with, for both longitudinal frame members 12, the top and bottom flanges 124, 126 of a given longitudinal frame member 12 extending internally from the main wall 122 in the direction of the central longitudinal and vertical plane P, thus in the direction of the opposite longi-tudinal frame member 12.

To form the ladder frame 10, the two longitudinal frame members 12 are rigidly connected one to the other by transverse cross members 14. Such a vehicle ladder frame 10 comprises at least two transverse cross-members 14 but usually more than two; for example three or four or five transverse cross-members, each cross-member being installed between the two longitudinal frame members 12 at a corresponding longitudinal position along the length of the chassis. A given ladder frame 10 may comprise several cross members 14 of the same or similar design. However, as shown in FIG. 1, a given ladder frame 10 may comprise at least one cross-member of a different design compared to the other cross-members, depending inter alia on the location of the cross-member along the longitudinal length of the chassis, and/or depending on the possible presence of other vehicle components, such as powertrain components (engine, electric motor(s) and/or gearboxes), and/or driveline components (driveshaft, axles, . . . ), and/or suspension components and/or steering components, etc. . . . , in the immediate surroundings of the cross-member. In FIG. 1, the ladder frame 10 comprises a rear cross-member 141, one or several intermediate cross-members 142, 143, 144, a front cross-member 145, and a lowered cross-member 146. In the shown example, the ladder frame 10 also comprises a secondary transverse cross-member 148. The secondary transverse cross-member 148 is for example located longitudinally near the front end of the rear portion of the ladder frame 10, for example at a location corresponding to, or close to, the rear end of a gear-box and/or corresponding to, or close to, the front end of a driveshaft of the vehicle driveline. When the vehicle is a truck, the secondary transverse cross-member 148 is for example near the read end of the driver cabin a of the truck. The secondary transverse cross-member 148 may for example add rigidity to the ladder frame 10 and assist the cabin suspension for better performance in terms of cabin suspension and comfort. The secondary transverse cross-member 148 may for example be a so-called "VIN" cross-member, where "VIN" stands for Vehicle Identification Number. Each transverse cross-member 14 extends transversally parallel to the transverse axis Y, is connected at one of its two transversally external extremities to one of the two longitudinal frame members 12, and is connected at the other of its two transversally external extremities to the other of the two longitudinal frame members 12. For example, the transverse cross members 14 are bolted to the two longitudinal frame members 12.

FIGS. 3 to 9 illustrate an example of a transverse cross-member assembly 14, which, as an example, may be one of the cross-members of FIG. 1, for example, the secondary cross member 148.

In some examples, including the depicted example, the transverse the cross-member assembly 14 comprises a transverse cross-member beam 16 and two mounting brackets 18. In this example, the two mounting brackets 18 are separate parts with respect to the transverse cross-member beam 16. However, in some examples, at least one, or both, of the two mounting brackets 18 may be integral with the transverse cross-member beam 16 or with a part therefore, in the sense of being monolithically formed together with the transverse cross-member beam 16 or with a part therefore. In both cases, each mounting bracket 18 is configured for mounting one transversally external extremity of the transverse cross-member beam 16 to the one of the two longitudinal frame members 12 of the ladder frame 10.

In some examples, including the shown example, the transverse cross-member beam 16 is formed of at least two separate parts, in this case formed of a first beam half 20A and a second beam half 20B. The transverse cross-member beam 16 is thus divided transversally in two parts, one beam half 20A being on the side of one of the longitudinal frame members 12, and the other beam half 20B being on the side of the other of the longitudinal frame members 12. Each beam half 20A, 20B thus extends transversally along only a portion of the total transverse width of the transverse cross-member beam 16. The first and second beam halves 20A, 20B are assembled transversally opposite one to the other to form the transverse cross-member beam 16.

In some examples, including the depicted example, the transverse cross-member beam 16 is symmetrical with respect to the central vertical and longitudinal plane P. In fact, in this example, the transverse cross-member assembly 14, including the two mounting brackets 18, is symmetrical with respect to the central vertical and longitudinal plane P.

According to a particularly advantageous but optional aspect of some examples, including the depicted example, the first and second beam halves 20A, 20B are identical and are assembled transversally opposite one to the other to form the transverse cross-member beam 16.

Each beam half 20A, 20B has an external extremity 22A, 22B, along the transverse direction, which is configured for connection, directly or indirectly, respectively to a first and to a second of the two longitudinal frame members 12. In some examples, including the depicted examples, the external extremity 22A, 22B of each beam half 20A, 20B is configured for connection, indirectly, to the corresponding longitudinal frame member 12 via one of the two mounting bracket 18.

Opposite the external extremity 22A, 22B along the transverse direction, each beam half 20A, 20B has an internal extremity 24A, 24B configured for connection to the internal extremity of the other beam half. In some examples, including the shown example, each beam half 20A, 20B has a dimension along the transverse axis Y which is slightly superior to half of the dimension along the transverse axis Y of the transverse cross-member beam 16, for example between 0.51 and 0.7 times the dimension along the transverse axis Y of the transverse cross-member beam 16. As a consequence, when the two beam halves 20A, 20B are assembled one to the other to form the transverse cross-member beam 16, the internal extremities 24A, 24B of the beam halves 20A, 20B overlap each other when viewed along the longitudinal axis X. In some examples, including the depicted example, the overlapping internal extremities 24A, 24B of the beam halves 20A, 20B form the center of the transverse cross-member beam 16 along the transverse axis Y and are located transversally at the central longitudinal and vertical plane P.

In some examples, including the depicted example, the transverse cross-member beam 16 forms an arch, where the external extremity 22A, 22B of each beam half if located vertically lower than the internal extremity 24A, 24B of each beam half 20A, 20B. The arch formed by the transverse cross-member beam 16 has a symmetrical profile with respect to the central vertical and longitudinal plane P, and the arch is parallel to a main cross-member plane M containing the vertical axis Z and the transverse axis Y. In some examples, including the shown example, the arch has a profile resembling that of on arc of an ellipse, with the long axis of the ellipse extending parallel to the transverse axis Y and the short axis of the ellipse extending parallel to the vertical axis Z. The ratio of the total width of the transverse cross-member beam 16 compared to the total height of transverse cross-member beam 16 is for example comprised within the range of 4:1 to 12:1, preferably in the range of 6:1 to 10:1. In the example, the arch has a profile that is curved along its length along the transverse axis Y, with a variable curve radius along that length. However, the arch could have a different profile, including a profile along an arc of circle, or a segmented profile comprising several linear segments or a mix of linear and curved segments.

Having a transverse cross-member beam 36 in the form of the arch make room in the space below the arch, between the two longitudinal frame members 12, for other vehicle components, such as for a gearbox or a driveshaft.

The internal extremity 24A, 24B of each beam half 20A, 20B has a mating surface 26A, 26B configured for mating to the mating surface 26B, 26A of the other beam half 26B, 26A. In some examples, including the depicted example, the mating surfaces of each beam half overlap each other when viewed along a longitudinal axis, and, when the two beam halves 20A, 20B are assembled one to the other to form the transverse cross-member beam 16, they are pressed in contact with each other by fasteners 28, which may be in the form of bolts, as shown in the example, or rivets.

In some examples, including the shown example, the mating surface 26A, 26B of each beam half 20A, 20B extends along the main cross-member plane M, and faces the mating surface 26B, 26A of the other beam half 20B, 20A. Thus, the mating surface 26A of one beam half 20A faces in one direction along the longitudinal axis X while the mating surface 26B of the other beam half 20B faces in the opposite direction along the longitudinal axis X.

In some examples, including the shown example, the mating surfaces 26A, 26B are rectangular surfaces of the internal extremity 24A, 24B of the corresponding beam half 20A, 20B. The mating surfaces 26A, 26B are located transversally at mid distance between the two longitudinal frame members 12.

In particular for those examples where, as in the shown example, the first and second beam halves 20A, 20B are identical and are assembled opposite one to the other to form the transverse cross-member beam 16, the internal extremity 24A, 24B of each beam half 20A, 20B is entirely contained on one longitudinal side of main cross-member plane M, with the mating surfaces 26A, 26B extending exactly in the main cross-member plane M.

In the example, the two beam halves 20A, 20B are configured so that they may be assembled one to the other at least two distinct relative positions separated along a horizontal transverse axis, to form the transverse cross-member beam 16. As a consequence, depending on the relative position at which the two beam halves 20A, 20B are assembled, the transverse cross-member beam 16 exhibits a different transverse width, and can therefore accommodate to any frame width tolerance between the longitudinal frame members 12, and/or accommodate to the presence or absence of a liner in longitudinal frame members 12. Preferably, as in some examples, including the shown example, the two beam halves 20A, 20B may be assembled one to the other at any relative position, or at any of several discrete positions, between two extreme relative positions along a horizontal transverse axis.

The mating surface 26A, 26B of each beam half 20A, 20B is thus preferably configured for mating to the mating surface of the other beam half at one of at least two distinct relative positions separated along a horizontal transverse axis, preferably at any relative position, or at any of several discrete relative positions, between two extreme relative positions along a horizontal transverse axis.

In some examples, including the shown example, the mating surfaces 26A, 26B of both beam halves 20A, 20B each have at least one fixation feature for fixation of the mating surface to the mating surface of the other beam half. Preferably, when the two beam halves 20A, 20B are assembled one to the other to form the transverse cross-member beam 16, a fixation feature on the mating surface of one the beam halves 26A, 26B corresponds to a fixation feature of the mating surface of the other beam half 26B, 26A. More particularly, when the two beam halves 20A, 20B are assembled one to the other to form the transverse cross-member beam 16, a fixation feature on the mating surface of one the beam halves 26A, 26B is aligned with a fixation feature of the mating surface of the other beam half 26B, 26A in parallel to the longitudinal axis. In some examples, including the shown example, the fixation feature for each of the mating surfaces 26A, 26B comprises at least one through hole 28 in the mating surface 26A, 26B, in this case two through holes 28 for each mating surface 26A, 26B. When the two beam halves 20A, 20B are assembled one to the other to form the transverse cross-member beam 16, a through hole 28 on the mating surface of one the beam halves 26A, 26B is aligned with a thorough hole 28 of the mating surface of the other beam half 26B, 26A, in parallel to the longitudinal axis, thus allowing the passage of a fastener, e.g. a bolt or a rivet, through the corresponding through holes 28. In some examples, including the shown example, the two fixation features of the mating surface of a given beam half 20A, 20B are located vertically one above the other on the mating surface. However, the two fixation features 28 of the mating surface of a given beam half 20A, 20B could be located horizontally side by side, or arranged diagonally.

In a non-depicted variant, a fixation feature of the mating surface of one beam half 20A, 20B could be a longitudinally extending stud while the corresponding fixation feature of the mating surface of other beam half 20A, 20B could be a through hole.

In a variant, the mating surface of a given beam half 20A, 20B can comprise two fixation features located horizontally side by side on the mating surface, under the form of one longitudinally extending stud and one through hole. Such variant is compatible with having the first and second beam halves identical and assembled opposite one to the other to form the cross-member beam 16, and provides that, when properly located, the longitudinally extending stud of the mating surface of one beam half 20A, 20B corresponds to the through hole of the mating surface of other beam half 20A, 20B, and vice versa.

In order to allow the mating surfaces 26A, 26B of each beam half 20A, 20B to mate at least two (respectively three, four, . . . ) distinct relative positions separated along a horizontal transverse axis, the mating surfaces can comprise two (respectively three, four, . . . ) sets of fixation features, one set corresponding one the two (respectively three, four, . . . ) distinct relative positions. For example, the mating surface 26A, 26B of at least one beam half 20A, 20B could comprise two sets of one or several through holes, each set corresponding to one of two distinct relative positions.

In order to allow the mating surfaces 26A, 26B of each beam half 20A, 20B to mate at any of several discrete positions, between two extreme relative positions along a horizontal transverse axis, the mating surface 26A, 26B of at least one beam half 20A, 20B may comprise a set of one or several through holes which are elongated along the transverse direction. In some examples, including the shown example, the mating surface 26A, 26B of both beam halves 20A, 20B each have a set of two through holes 28 which are elongated along the transverse direction, further allowing the two beam halves 20A, 20B to be identical and assembled transversally opposite one to the other to form the cross-member beam 16.

In some examples, including the shown example, the mating surfaces 26A, 26B are flat. This allows for the mating surface 26A, 26B of each beam half 20A, 20B at any relative position, or at any of several discrete positions, between two extreme relative positions along a horizontal transverse axis.

In some examples, including the shown example, the mating surfaces 26A, 26B are smooth. However, at least one of the mating surfaces, or both mating surfaces, could be a flat surface having a roughened or patterned texture to increase friction between the two mating surfaces when they are assembled.

In a non-depicted example, the mating surfaces 26A, 26B of each beam half 20A, 20B may have respective complementary three-dimensional repeating patterns, both patterns being periodic along the transverse direction, so as to allow the mating surfaces 26A, 26B of each beam half 20A, 20B to mate at any of several discrete relative positions between two extreme relative positions along a horizontal transverse axis, two consecutive discrete relative positions being separated by on period of the repeating patterns. For example, each repeating pattern may comprise, on the mating surface, a series of adjacent teeth of triangular cross-section, the teeth extending on the mating surface along a direction perpendicular to the transverse direction.

In some examples, including the shown example, the external extremity 22A, 22B of each beam half 20A, 20B has a bracket interface portion 32 having at least one downwardly oriented bracket contact surface 34 defining a downward bracket contact direction D34, the downward bracket contact direction D34 being downwardly oriented in a vertical and transverse plane which is the main cross-member plane M or a parallel plane. The downwardly oriented bracket contact surface 34 is configured to come into contact with an upwardly oriented beam contact surface of the bracket 18. In the example, the downward bracket contact direction D34 is perpendicular to the downwardly oriented bracket contact surface 34, and directed away from the downwardly oriented bracket contact surface 34. The downward bracket contact direction D34 represents a direction of force applied by the downwardly oriented bracket contact surface 34 on the bracket 18.

In the example shown, the downwardly oriented bracket contact surface 34 is a planar surface which is parallel to the longitudinal axis X, but which is angled with respect to the vertical axis Z by an angle that is for example comprised in the range from 10 to 60 degrees, preferably comprised in the range from 20 to 30 degrees.

In the example shown, the downwardly oriented bracket contact surface 34 of the external extremity 22A, 22B of each beam half 20A, 20B is turned away from the central longitudinal and vertical plane P. As a result, the downward bracket contact direction D34 is, at each external extremity 22A, 22B of each beam half 20A, 20B, directed away from the central and central longitudinal and vertical plane P.

In some examples, including the shown example, the two mounting brackets 18 of the transverse cross-member assembly are identical and are mounted symmetrically with respect to the central longitudinal and vertical plane P. The two mounting brackets 18 are configured for being fixed each, by a respective beam interface portion 35, to the external extremity 22A, 22B of one of the two beam halves 20A, 20B.

As visible in some examples, including the shown example, each mounting bracket 18 comprises a beam interface portion 35 having at least one upwardly oriented beam contact surface 36, which is configured for contacting the extremity 22A, 22B of the corresponding beam half 20A, 20B of the cross-member beam 36. More specifically, the upwardly oriented beam contact surface 36 of the bracket 18 is configured for contacting the downwardly oriented bracket contact surface 34 f the corresponding beam half 20A, 20B, and vice versa. The upwardly oriented beam contact surface 36 defines an upward beam contact direction D36 that is upwardly oriented in a vertical and transverse plane, which is the main cross-member plane M or a parallel plane. In the example, the upward beam contact direction D36 is perpendicular to the upwardly oriented beam contact surface 36, and directed away from the upwardly oriented beam contact surface 36 of the bracket 18. The upward beam contact direction D36 represents a direction of force applied by the upwardly oriented bracket beam surface 36 on the external extremity 22A, 22B of the corresponding beam half 20A, 20B.

In the example shown, the upwardly oriented beam contact surface 36 is a planar surface which is parallel to the longitudinal axis X, but which is angled with respect to the vertical axis Z by an angle that is preferably equal to the angle of the downwardly oriented bracket contact surface 34 with respect to the vertical, thus for example comprised in the range from 10 to 60 degrees, preferably comprised in the range from 20 to 30 degrees.

In the example shown, the upwardly oriented beam contact surface 36 is turned towards the central longitudinal and vertical plane P. As a result, the upward beam contact direction D36 is directed towards the central longitudinal and vertical plane P.

Preferably, the upwardly oriented beam contact surface 36 is located adjacent or around at least one beam fixation feature of the bracket 18. In some examples, including the shown example, the bracket 18 comprises two beam fixation features, each of which comprises, in the example, a threaded stud 38 that extends upwardly perpendicularly to the upwardly oriented beam contact surface 36. The studs 38 extend thus in the same direction as the upward beam contact direction D36. The bracket interface portion 32 of the corresponding beam half 20A, 20B has corresponding through holes 40 through which the studs 36 extend when the mounting bracket is assembled to the corresponding beam half 20A, 20B. Nuts 42 are provided for being screwed on the threaded studs 38 for tightening the bracket interface portion 32 of the corresponding beam half 20A, 20B on the beam interface portion 35 of the corresponding bracket 18. Preferably, the holes 40 are formed so as to open into or adjacent to the downwardly oriented bracket contact surface 36, and the holes 40 can be considered as fixation features of the external extremity 22A, 22B of the beam half 20A, 20B. In other words, the downwardly oriented bracket contact surface 36 is located adjacent or around a fixation feature 40 of the external extremity 22A, 22B of the beam half 20A, 20B.

In particular for those examples where, as in the shown example, the first and second beam halves 20A, 20B are identical and are assembled opposite one to the other to form the transverse cross-member beam 16, the fixation features of the bracket 18 are preferably symmetrically arranged with respect to the main cross-member plane M. Similarly, the fixation features of the external extremity 22A, 22B of the beam half 20A, 20B are preferably symmetrically arranged with respect to the main cross-member plane M.

In some examples, including the shown example, each threaded stud 38 of the bracket forms also a beam-positioning feature, which, at the moment of assembly, helps in positioning correctly the corresponding beam half 20A, 20B on the bracket 18, before the nuts 42 are screwed and tightened. Thus, each stud 38 is both a beam positioning and a fixation feature. However, the bracket 18 could be provided with one or several beam-positioning feature(s) distinct from any beam fixation feature. Such a distinct beam-positioning feature could for example be a non-threaded stud or could be a recess for receiving a positioning stud pertaining to the bracket interface portion 32 of the corresponding beam half 20A, 20B.

Of course, a beam fixation feature of the bracket 18 could take the form of a hole for the passage of a bolt, or for the passage of a threaded stud of the bracket interface portion 32 of the corresponding beam half 20A, 20B.

Each mounting bracket 18 also comprises a frame interface portion 43 for mounting the mounting bracket 18 on the corresponding longitudinal frame member 12, either directly on the internally facing surface of the main wall 122 of the longitudinal frame member 12, or on a liner thereof. For increased stability, the frame interface portion 43 of the mounting bracket has at least three, preferably at least four non-aligned frame contact locations 44 that are configured for contacting the corresponding one of the two longitudinal frame members 12. Together, the frame contact locations 44 define a vertical and longitudinal frame contact plane F perpendicular to the horizontal transverse axis Y, thus parallel to the surface of the longitudinal frame member 12 on which the mounting bracket 18 is to be affixed. In some examples, including the shown examples, the frame contact locations 44 are arranged at the four corners of a square or of a rectangle in the vertical and longitudinal frame contact plane F.

Each frame contact location 44 preferably comprises a distinct frame fixation feature 46. However, one or several frame contact location could be provided without any frame fixation feature, such frame contact location having nevertheless the advantage of increasing the contact stability between the mounting bracket 18 and he longitudinal frame member 12. Each frame fixation feature 46 preferably corresponds to a fixation feature of the corresponding longitudinal frame member 12, for example one of the holes 128 mentioned above. In some examples, including the depicted example, the frame fixation features 46 are each in the form of a transversally extending through hole for the passage of a bolt. However, one or several of the frame fixation feature 46 could be in the form of a transversally extending threaded stud affixed to, or integral with the frame interface portion 43 of the mounting bracket 18.

In the shown example, the frame contact locations 44 are distinct one from the other. Each frame contact location 44 is formed at the external extremity of an individual leg 48. The legs 48 extend radially with respect to a horizontal axis from a central hub of the frame interface portion 43, as the legs of a spider. Each leg 48 is also inclined towards the external direction compared to the central hub such that the only the frame contact locations 44, at the external extremity of each individual leg 48, contact the longitudinal frame member 12. In some examples, including the depicted example, the frame interface portion 43 has four non-aligned and separate frame contact locations 44 which are configured for contacting one of the two frame members 12 and which each comprise a distinct frame fixation feature 46, the four separate frame contact locations 44 forming each an end of one of four separate legs 48 of the frame interface portion 43 of the mounting bracket 18.

In particular, for those examples where, as in the shown example, the first and second beam halves 20A, 20B are identical and are assembled opposite one to the other to form the transverse cross-member beam 16, the frame fixation features 46 of the bracket 18 are preferably symmetrically arranged with respect to the main cross-member plane M. Such feature combines with the previously described features that the internal extremity 24A, 24B of each beam half 20A, 20B is entirely contained on one longitudinal side of main cross-member plane M, and that the mating surfaces 26A, 26B extend exactly in main cross-member plane M. Such combination allows using identical first and second beam halves 20A, 20B assembled opposite one to the other to form the transverse cross-member beam 16 in such a way that the two mating surfaces of the two beam halves come into contact one with the other when the transverse cross-member assembly 148 is mounted into the ladder frame 10.

Figures 4, 5:
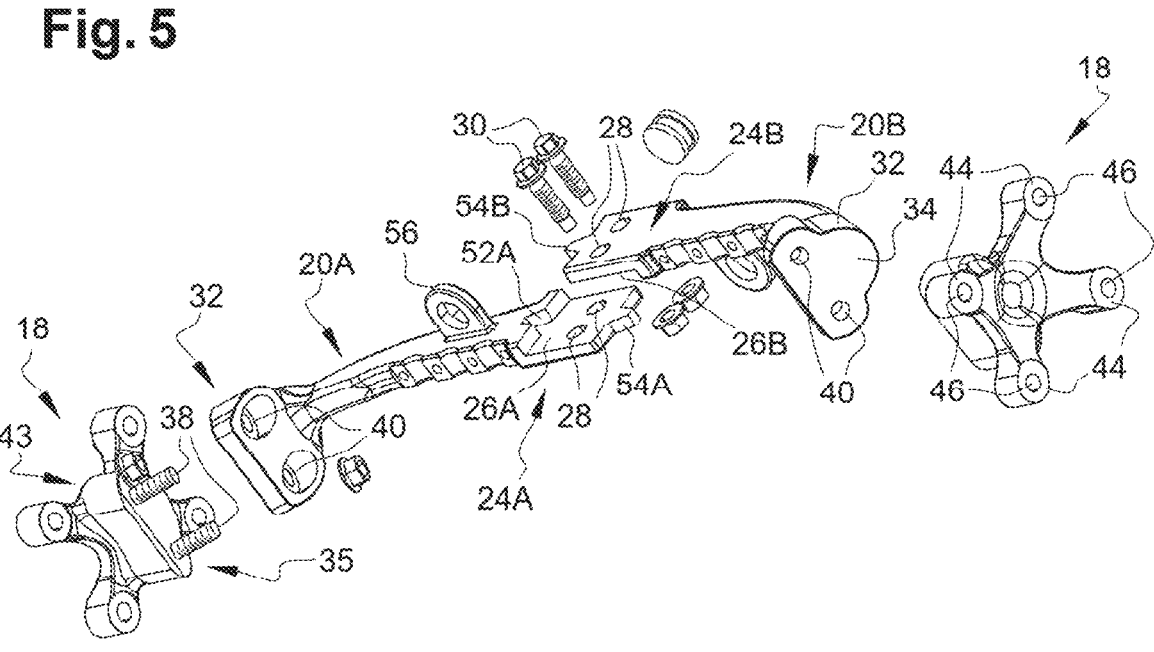
FIG. 4 is a perspective view, along a first viewing angle, of the transverse cross-member according to the example of FIG. 3.
FIG. 5 is a perspective exploded view, along a second viewing angle, of some components of the transverse cross-member according to the example of FIG. 3.
Figure 6:
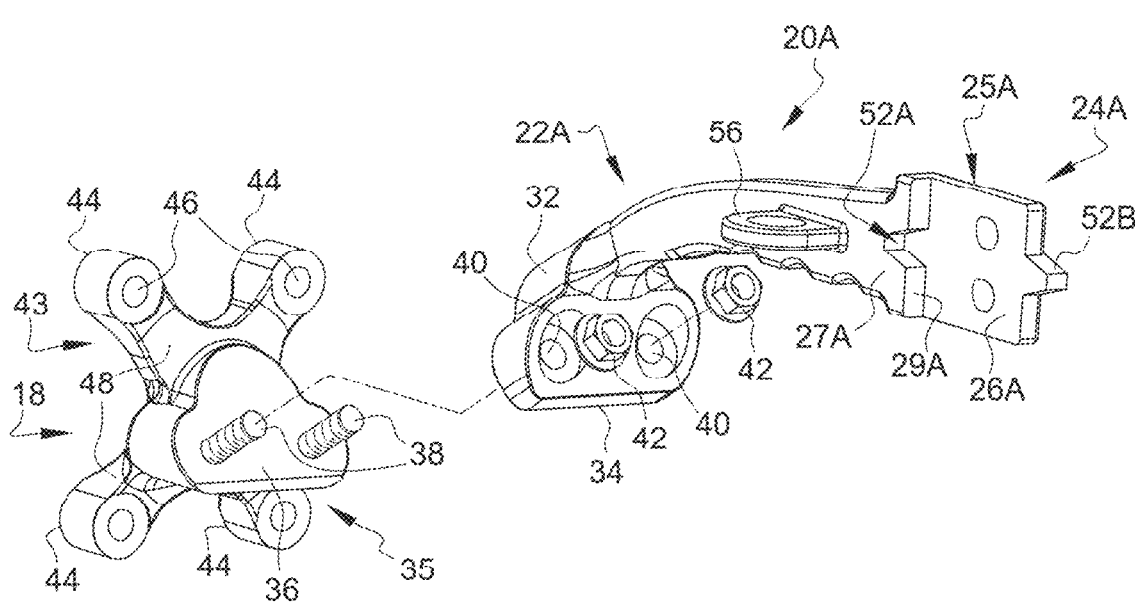
FIG. 6 is a perspective exploded view, along a third viewing angle; of some components of one mounting bracket and one beam half of the transverse cross-member according to the example of FIG. 3.
Figure 7:
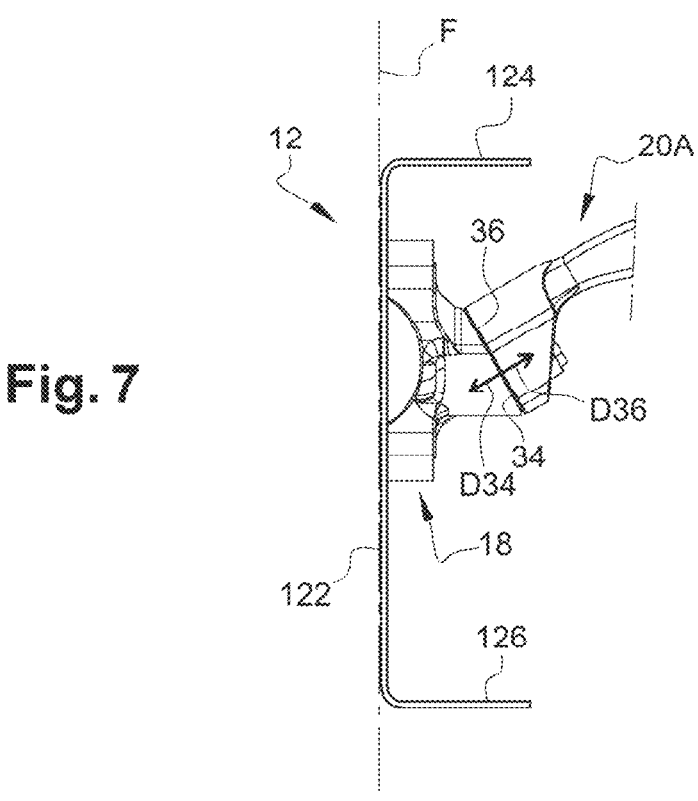
FIG. 7 is a partial rear view of some components of one mounting bracket and one beam half of the transverse cross-member according to the example of FIG. 3., mounted on an exemplary longitudinal frame member of a ladder frame.
Figures 8, 9, 10:
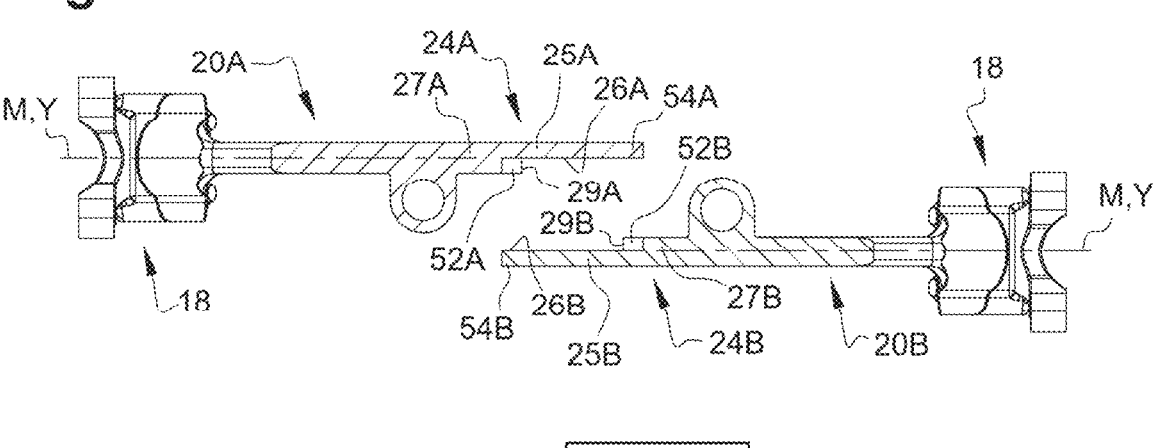
FIG. 8 is a top view of the transverse cross-member according to the example of FIG. 3.
FIG. 9 is a top cross-section, along the line 9-9 of FIG. 3, of the transverse cross-member according to the example of FIG. 3, where the two beam halves are, for the purpose of illustration, displaced one with respect to the other along the longitudinal direction.
FIG. 10 is a flow chart of an exemplary method for assembling a vehicle.

As clearly visible on FIG. 3 and on FIG. 7, the frame interface portion 43 of the mounting bracket 18 has a concave longitudinal recess 50 in its external surface turned towards the longitudinal frame member 12 on which the mounting bracket 18 is to be affixed. The concave longitudinal recess 50 is thus open in the frame contact plane F and extends longitudinally so as to be open at the longitudinal extremities of the mounting bracket 18. As clearly visible on FIG. 7, when the mounting bracket 18 is mounted on the longitudinal frame member 12, the concave longitudinal recess 50 forms a tunnel between the mounting bracket 18 and the longitudinal frame member 12, tunnel which extends along the whole length of the mounting bracket 18 along the longitudinal axis X, and which is open at its both longitudinal extremities. Electrical wires, communication lines and/or fluid pipes can thus be routed through this tunnel.

In some examples, the mounting bracket 18 is made of metal, for example made of aluminum or aluminum alloy. It can be a molded part.

Preferably, each mounting bracket 18 is symmetrical is respect to the main cross-member plane M.

It will now be described some operations of a possible method for assembling a vehicle chassis, in particular a ladder frame chassis, comprising a transverse cross-member assembly. The described operations are specifically for mounting a transverse cross-member assembly into a ladder frame for a vehicle case In a first phase, the method may include, in whichever order, the following operations:

mounting a first mounting bracket 18 on a first longitudinal frame member 12;

mounting a first beam half 20A on the first mounting bracket 18;

mounting a second mounting bracket 18 on a second longitudinal and horizontal frame member 12.

The above first phase is performed preferably after the two longitudinal frame members 12 have been assembled together, for example by one or several transverse cross-member assemblies 14, to form a ladder frame. However, it also could be arranged that one or both of the mounting brackets 18 is assembled to the corresponding longitudinal frame member 12 before the two longitudinal frame members 12 have been assembled together. Preferably, the operations of mounting of the respective parts above, includes fastening said parts on the objected on which they are mounted. However, such fastening can be a preliminary fastening, to be completed at a later time point in the method.

In a second phase, posterior to the first phase, the method may include, in whichever order, the following operations:

positioning the external extremity 22B of the second beam half 20B on the second mounting bracket 18;

positioning the internal extremity 24B of the second beam half 20B in contact with the internal extremity of the first beam half 20B.

In an example involving a transverse cross-member assembly as described above in relation to the FIGS. 3 to 9, positioning the external extremity 22B of the second beam half 20B on the second mounting bracket 18 may for example be performed by engaging the respective positioning features of the external extremity 22B of the second beam half 20B and of the second mounting bracket 18. In an example, this may be performed by engaging the through holes 40 of the external extremity 22B of the second beam half 20B onto the studs 38 of the mounting bracket 18. At least in this second phase, the longitudinal frame members preferably extend horizontally.

At this stage of the method, the second beam half 20B is only positioned with respect second mounting bracket and with respect to the internal extremity of the first beam half, without being fastened thereto.

Indeed, the method comprises a third phase, which is posterior to the second phase, and which may include the following operations, in whichever order:

fastening the external extremity 22B of the second beam half 20B on the second mounting bracket 18;

fastening the internal extremity 24B of the second beam half 20B with the internal extremity 22A of the first beam half 20A.

At the end of the second stage, and before the third stage, the second beam half 20B is not yet securely fastened. It is nevertheless favorable that, at that stage, the external extremity 22B of the second beam half 20B may rest on the upwardly oriented beam contact surface 36 of the beam interface portion 35 of the mounting bracket 18. Indeed, this contact defines an upward beam contact direction, which maintains the position of the external extremity 22B of the second beam half 20B against gravity.

On the other hand, without any specific provision, the internal extremity 24B of the second beam half 20B would remain subject to gravity, so the second beam half 20B would tend to fall, by rotation around the respective contact surfaces of the external extremity 22B of the second beam half 20B and of the beam interface portion 35 of the mounting bracket 18. Therefore, without any specific provision, it would be necessary to maintain the position of the second beam half 20B against gravity while performing the operations of the third stage described above.

According to an aspect, the transverse cross-member beam 16 is provided with means to alleviate this need for maintaining the position of the second beam half 20B against gravity while performing the operations of the third stage.

According to an aspect, the internal extremity of each beam half 20A, 20B has a first abutment portion 52A, 52B configured for abutment against a second abutment portion 54A, 54B of the other beam half 20B, 20A. The first and second abutment portions 52A, 52B, 54A, 54B are configured to block relative movement of the internal extremity 24A, 24B of each beam half 20A, 20B relative to the external extremity 22A, 22B of its beam half, i.e. relative to the external extremity 22A, 22B of the beam half to which said beam half internal extremity pertains. More specifically, the first and second abutment portions 52A, 52B, 54A, 54B may be configured to block any relative downward rotation of the internal extremity 24A, 24B of each beam half 20A, 20B relative to the external extremity 22A, 22B of its beam half.

In some examples, including the depicted example, the first abutment portion 52A, 52B of one beam half and the second abutment portion 54A, 54B of the other beam half have a corresponding male/female geometry. In such a case, the male geometry is received within the female geometry, at least during the positioning the internal extremity 24B of the second beam half 20B in contact with the internal extremity of the first beam half 20A in the case of the method described above, prior to the fastening of the internal extremity 24B of the second beam half 20B with the internal extremity 22A of the first beam half 20A. Thereby, the male geometry abuts internally with the female geometry to block relative movement of the internal extremity 24A, 24B of each beam half 20A, 20B relative to the external extremity 22A, 22B of its beam half.

Preferably, the male/female geometries of the first abutment portion 52A, 52B of one beam half and of the second abutment portion 54A, 54B of the other beam half are configured to allow introduction of the male geometry into the female geometry along a longitudinal direction. This allows to bring the first abutment portion 52A, 52B and a second abutment portion 54A, 54B of the two beam halves 20B, 20A in abutment one against the other by a relative movement of the respective internal extremities 24A, 24B along the direction of the longitudinal axis X. In the method above, introduction of the male geometry into the female geometry along a longitudinal direction is performed during the positioning the internal extremity 24B of the second beam half 20B in contact with the internal extremity of the first beam half 20A. Therefore, this introduction of the male geometry into the female geometry can be performed notwithstanding the fact that the fixed available width between the two longitudinal frame members 12 limits the latitude of relative movement along the transverse direction.

In some examples, including the depicted example, the male geometry of the abutment portion of a given beam half comprises a V shaped extension 54A, 54B of the internal extremity 24A, 24B of that given beam half 20A, 20B. The V-shape of the V shaped extension 54A, 54B extends in a vertical transverse plane, i.e. perpendicular to the longitudinal axis X, parallel to main cross-member plane M, and points in a transverse internal direction with respect to that given beam half. In other words, the V-shape of the V shaped extension 54A, 54B points transversally away from the given beam half to which it pertains, and thus points in the direction of the other beam half, more precisely in the direction of female geometry of the abutment portion 52A, 52B of the other beam half.

In such example, the female geometry of the abutment portion of the other beam half comprises a corresponding V-shaped recess 52B, 52A pertaining to the internal extremity 24B, 24A of that other beam half 20B, 20A. The V-shape of the recess 52B, 52A of that other beam half 20B, 20A also extends in a vertical transverse plane, i.e. perpendicular to the longitudinal axis X, parallel to the main cross-member plane M. However, the V-shape of the recess 52B, 52A of that other beam half 20B, 20A points in a transverse external direction with respect to that other beam half 20B, 20A. In other words, the V-shape of the V shaped recess 52B, 52A points transversally towards the external extremity of that given beam half 20B, 20A to which it pertains. In other words, quite evidently in view of the fact that the male geometry is to be received within the female geometry, the V shaped extension 54A, 54B of a given beam half 20A, 20B points in the same direction as the V-shaped recess 52B, 52A of the other beam half 20B, 20A to which it is assembled to form a transverse cross-member beam 16. Also, the V-shaped recess is preferably open on one side along the longitudinal axis X and is open transversely at its base side along the transverse external direction with respect to the beam half to which it pertains.

In some examples, including the shown example, the internal extremity 24A, 24B of each beam half 20A, 20B comprises a plate member 25A, 25B, which has a contour that may be for example rectangular, and which is parallel to the main cross-member plane M while being entirely contained on one longitudinal side of main cross-member plane M. Therefore, one surface of the plate member forms the mating surfaces 26A, 26B which extends exactly in the main cross-member plane M. The plate member 25A, 25B has a given thickness along the longitudinal direction. On the external transverse side of the plate member, the internal extremity 24A, 24B has a thickened portion 27A, 27B, which is for example twice the thickness of the plate member, and which extends symmetrically on both sides of the main cross-member plane M. A vertical and longitudinal demarcation surface 29A, 29B marks the demarcation between the plate member 25A, 25B and the thickened portion 27A, 27B. In the example, the V-shape of the recess 52B, 52A is formed in the thickened portion 27A, 27B of the internal extremity 24A, 24B, with the base of the V-shape of the recess coinciding with, and opening into the demarcation surface 29A, 29B, and with the V-shape of the recess pointing away from the demarcation surface 29A, 29B. The recess has a depth along the longitudinal direction such that is extends at least up to the main cross-member plane M. In the example, the V shaped extension 54A, 54B of the internal extremity 24A, 24B is an extension of the plate member 25, which extends entirely on the same longitudinal side of the main cross-member plane M.

To allow for the mating of the internal extremities 22A, 22B of each beam half 20A, 20B at least two distinct relative positions separated along a horizontal transverse axis, the first abutment portion 52A, 52B of one beam half and the second abutment portion 54A, 54B of the other beam half are arranged on their respective beam halves 20A, 20B so as to show a transversal gap. The transversal gap may be brought to zero for the relative position of the beam halves 20A, 20B corresponding to the minimum transverse width of the cross-member. In the case of the abutment portions 52A, 52B, 54A, 54B having a corresponding male/female geometry, the male and female geometries preferably have a dimension along the transverse axis Y which is at least equal to the distance between the at least two distinct relative positions along the transverse axis Y. In such a case, the male geometry may be received within the female geometry irrespective of the relative mating position of the internal extremities 22A, 22B of each beam half 20A, 20B, between the at least two distinct relative mating positions. However, such a feature is not compulsory because the abutment portions 52A, 52B, 54A, 54B are operative during a phase of the mounting method at which at least one of the beam halves is not yet fastened, thus not necessarily yet in its final assembly position. When that beam half is fastened in its final assembly position, the abutment portions 52A, 52B, 54A, 54B are not necessarily operative.

On the other hand, when coming back to the method of mounting the transverse cross-member assembly, the operation, in the second phase, of positioning the internal extremity 24B of the second beam half 20B in contact with the internal extremity of the first beam half 20A, is preferably performed in such a way that the first abutment portion of one of the beam halves abuts against the second abutment portion of the other beam half. Such abutment maintains the internal extremity 24B of the second beam half 20B against gravity. Especially in the case of manual mounting by an operator, this allows the operator to concentrate on the next operations, especially on those operations of the third phase above, such as the fastening of the external extremity 22B of the second beam half 20B on the second mounting bracket 18, and/or the fastening of the internal extremity 24B of the second beam half 20B with the internal extremity 22A of the first beam half 20A.

The transverse cross-member assembly as described above, made of four separates parts, especially with respect to the cross-member beam 16 made of two beam halves, is advantageous in that each part can be lighter than the complete assembly, and can be more compact. The cross-member beam 16 made of two beam halves having each a transverse dimension almost half of the complete cross-member beam 16 is advantageous in terms of compactness, both during manufacturing, transport and storing in the supply chain before assembly on the vehicle, and during the assembly process onto the ladder frame. This is of course especially true in case of the assembly process on the ladder frame being performed manually or partly manually by human operators.

The first and second beam halves 20A, 20B can advantageously be made of aluminum or aluminum alloy, to reduce the weight of each of first and second beam halves 20A, 20B, which is advantageous especially true in case of the assembly process on the ladder frame being performed manually or partly manually by human operators. Weight reduction of cross-member beam 16 as a whole can also be obtained, which is favorable for the performance of the vehicle, such as in terms of energy consumption and/or payload capacity.

The first and second beam halves 20A, 20B can advantageously be made of molded metal, which allows for ease of manufacture. Manufacturing by molding is also advantageous in that it allows to easily integrate further functions to the first and second beam halves 20A, 20B. For example, the example transverse cross-member beam shown in the figures has, on its first and second beam halves 20A, 20B, an integrally molded accessory component support or fixation member 56, which may form for example an integrated bracket for the mounting of an ancillary device such as a sensor, an actuator, a control module, etc.

The examples and methods above are particularly useful for a so-called secondary transverse cross-member 148, which is mounted after the ladder frame 10 has been preliminarily formed although not completed, and after some vehicle components have already been mounted on the ladder frame 10.

An example of a method for assembling a vehicle may thus comprise the following operations:

connecting two longitudinal and horizontal frame members 12 by at least two primary transverse cross-members 141, 142, 143 to form a ladder frame chassis 10 of the vehicle;

mounting one or several vehicle components, selected in the list of powertrain components, and/or driveline components, and/or suspension components and/or steering components, onto the ladder frame chassis 10;

subsequently to said mounting of one or several vehicle components, mounting a secondary transverse cross-member assembly, as described above, into the ladder frame chassis 10, for example according to the method described above.

Examples of the disclosure also include the following examples.

Example 1: A transverse cross-member beam (16) for mounting between two longitudinal and horizontal frame members (12) of a vehicle chassis, comprising a first beam half (20A) and a second beam half (20B), each beam half (20A, 20B) having an external extremity (22A, 22B) configured for connection respectively to a first and to a second of the two longitudinal frame members (12), and each beam half (20A, 20B) having an internal extremity (24A, 24B) configured for connection to the internal extremity (24B, 24A) of the other beam half (20B, 20A);

wherein the internal extremity (24A, 24B) of each beam half (20A, 20B) has a mating surface (26A, 26B) configured for mating to the mating surface (26B, 26A) of the other beam half (20B, 20A) at one of at least two distinct relative positions separated along a horizontal transverse axis (Y), the mating surfaces (26A, 26B) of both beam halves (20A, 20B) having each at least one fixation feature (28) for fixation of the mating surface (26A, 26B) to the mating surface (26B, 26A) of the other beam half (20B, 20A);

and wherein the internal extremity (24A, 24B) of each beam half (20A, 20B) has a first abutment portion (52A, 52B) configured for abutment against a second abutment portion (54A, 54B) of the other beam half (20B, 20A), the first and second abutment portions (52A, 52B, 54A, 54B) being configured to block relative movement of each beam half internal extremity (24A, 24B) relative to the external extremity (22A, 22B) of the beam half (20A, 20B) to which said beam half internal extremity (24A, 24B) pertains.

Example 2: The transverse cross-member beam of example 1, wherein the first abutment portion (52A, 52B) of one beam half (20A, 20B) and the second abutment portion (54B, 54A) of the other beam half (20B, 20A) have a corresponding male/female geometry, and wherein the male geometry (54B, 54A) is received within the female geometry (52A, 52B).

Example 3: The transverse cross-member beam of example 2, wherein the male/female geometries of the first abutment portion (52A, 52B) of one beam half (20A, 20B) and the second abutment portion (54A, 54B) of the other beam half (20B, 20A) are configured to allow introduction of the male geometry into the female geometry along a longitudinal direction (X).

Example 4: The transverse cross-member beam of any of examples 2-3, wherein the male geometry of the abutment portion (54A, 54B) of one beam half (20A, 20B) comprises a V shaped extension of the internal extremity (24A, 24B) of the beam half (20A, 20B), the V-shape extending in a vertical transverse plane and pointing in a transverse internal direction with respect to that beam half (20A, 20B), and the female geometry (52A, 52B) of the abutment portion of the other beam half (20B, 20A) comprises a corresponding V-shaped recess of the internal extremity (24B, 24A) of the beam half, the V-shape extending in a vertical transverse plane and pointing in a transverse external direction with respect to that other beam half (20B, 20A), and the V-shaped recess (52A, 52B) being open on one side along the longitudinal axis (X) and being open transversely at its base side along a transverse internal axis with respect to that other beam half (20B, 20A).

Example 5: The transverse cross-member beam of any of examples 1-4, wherein the mating surfaces (26A, 26B) of each beam half (20A, 20B) overlap each other when viewed along a longitudinal axis (X).

Example 6: The transverse cross-member beam of any of examples 1-5, wherein the mating surface (26A, 26B) of each beam half (20A, 20B) extends along a vertical and transverse plane (M).

Example 7: The transverse cross-member beam of any of examples 1-6, wherein the beam forms an arch, where the external extremity (22A, 22B) of each beam half (20A, 20B) is located vertically lower than the internal extremity (24A, 24B) of each beam half.

Example 8: The transverse cross-member beam of any of examples 1-7, wherein the first and second beam halves (20A, 20B) are identical and are assembled opposite one to the other to form the cross-member beam (16).

Example 9: The transverse cross-member beam of any of examples 1-8, wherein the first and second beam halves (20A, 20B) are made of aluminum or aluminum alloy.

Example 10: The transverse cross-member beam of any of examples 1-9, wherein the first and second beam halves (20A, 20B) are made of molded metal.

Example 11: The transverse cross-member beam of example 10, wherein at least one of the first and second beam halves (20A, 20B) comprises an integrally molded accessory component support or fixation member (56).

Example 12: The transverse cross-member beam of any of examples 1-11, wherein each beam half external extremity (22A, 22B) is configured for connection to the corresponding longitudinal frame member (12) via a mounting bracket (18).

Example 13: The transverse cross-member beam of example 12, wherein the external extremity of each beam half (20A, 20B) has a bracket interface portion (32) having at least one downwardly oriented bracket contact surface (34) defining a downward bracket contact direction (D34), the downward bracket contact direction (D34) being downwardly oriented in a vertical and transverse plane (M).

Example 14: The transverse cross-member beam of example 13, wherein the first and second abutment portions (52A, 52B, 54A, 54B) are configured to block relative movement of each beam half internal extremity (22A, 22B) with respect to the bracket contact surface (34) of the external extremity (24A, 24B) of the beam half (20A, 20B) to which said beam half internal extremity (24A, 24B) pertains.

Example 15: The transverse cross-member beam of any of examples 13-14, wherein the at least one downwardly oriented bracket contact surface (34) is located adjacent or around a fixation feature (40) of the external extremity (22A, 22B) of the beam half (20A, 20B).

Example 16: A mounting bracket (18) for mounting a transverse cross-member beam (16) between two longitudinal and horizontal frame members (12) of a vehicle chassis, comprising:

a frame interface portion (43) having at least three non-aligned frame contact locations (44) which are configured for contacting one of the two frame members (12) and which each comprise a distinct frame fixation feature (46), and wherein the frame contact locations (44) define a vertical and longitudinal frame contact plane (F) perpendicular to a horizontal transverse axis (Y);

a beam interface portion (35) having at least one upwardly oriented beam contact surface (36), configured for contacting one extremity (22A, 22B) of the transverse cross-member beam (16), and defining an upward beam contact direction (D36), and wherein the upward beam contact direction (D36) is upwardly oriented in a vertical and transverse plane (M).

Example 17: A mounting bracket according to example 16, wherein the at least one upwardly oriented beam contact surface (36) is located adjacent or around a beam fixation feature (38).

Example 18: A mounting bracket according to any of examples 16 or 17, wherein the beam interface portion (35) comprises at least one beam positioning feature (38).

Example 19: A mounting bracket according to example 18, wherein the beam positioning feature (38) is a beam positioning and fixation feature.

Example 20: A mounting bracket according to example 19, wherein the beam positioning and fixation feature comprises a threaded stud (38).

Example 21: A mounting bracket according to any of examples 16-20, wherein the frame interface portion (43) has a concave longitudinal recess (50) in its external surface turned towards the longitudinal frame member (12) on which the mounting bracket (18) is to be affixed, the concave longitudinal recess (50) being open in the frame contact plane (F) and extending longitudinally so as to be open at the longitudinal extremities of the mounting bracket (18).

Example 22: A mounting bracket according to any of examples 16-21, wherein the frame interface portion (43) has four non-aligned and separate frame contact locations (44) which are configured for contacting one of the two frame members (12) and which each comprise a distinct frame fixation feature (46), the four separate frame contact locations (44) forming each end of one of four separate legs (48) of the frame interface portion (43).

Example 23: A mounting bracket according to any of examples 16-22, wherein the mounting bracket (18) is made of molded metal.

Example 24: A mounting bracket according to any of examples 16-23, wherein the mounting bracket (18) is made of aluminum or aluminum alloy.

Example 25: A transverse cross-member assembly (14) comprising a transverse cross-member beam (16) according to any of examples 1-15 and two mounting brackets (18) according to any of examples 16-24, wherein the two mounting brackets (18) are configured for being fixed each by their beam interface portion (35) to the external extremity (24A, 24B) of one of the two beam halves (20A, 20B).

Example 26: A vehicle comprising a chassis having two longitudinal and horizontal frame members (12), the vehicle further comprising a transverse cross-member beam (16) according to any of examples 1-15 and two mounting brackets (18) according to any of examples 16-24 and/or comprising a transverse cross-member assembly (14) according to example 25.

Example 27: A method (200) for mounting of a transverse cross-member assembly (14) according to example 25 into a ladder frame (10), comprising:

a first phase (210) which includes, in whichever order:

mounting (212) a first mounting bracket (18) on a first longitudinal frame member (12);

mounting (214) a first beam half (20A) on the first mounting bracket (18);

mounting the second mounting bracket (20B) on the second longitudinal frame member (12);

a second phase (220), posterior to the first phase (210), which includes, in whichever order:

positioning (222) the second beam half external extremity (24B) on the second mounting bracket (18);

positioning (224) the second beam half internal extremity (22B) in contact with the internal extremity (22A) of the first beam half (20A) in such a way that the first abutment portion (52A, 52B) of one of the beam halves (20A, 20B) abuts against the second abutment portion (54B, 54A) of the other beam half (20N, 20A);

a third phase (230), posterior to the second phase (220), which includes, in whichever order:

fastening (232) the second beam half external extremity (24B) on the second mounting bracket (18);

fastening the second beam half internal extremity (22B) with the internal extremity (22A) of the first beam half (20A).

Example 28: A method (300) for assembling a vehicle, comprising:

connecting (310) two longitudinal frame members (12) by at least two primary transverse cross-members (141, 142, 143, 144) to form a ladder frame (10) of the vehicle;

mounting (320) one or several vehicle components selected in the list of powertrain components, and/or driveline components, and/or suspension components and/or steering components onto the ladder frame (10);

subsequently to the mounting (320) of one or several vehicle components, mounting (200) a transverse cross-member assembly (14) according to example 25 into the ladder frame (10).

Example 29: The method for assembling a vehicle according to example 28, wherein the mounting (200) of a transverse cross-member assembly (14) according to example 25 into the ladder frame (10) is performed according to the method of example 27.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A transverse cross-member beam for mounting between two longitudinal and horizontal frame members of a vehicle chassis, comprising a first beam half and a second beam half identical to the first beam half, each beam half having an external extremity configured for connection respectively to a first and to a second of the two longitudinal frame members, and each beam half having an internal extremity configured for connection to the internal extremity of the other beam half;

wherein the internal extremity of each beam half has a mating surface configured for mating to the mating surface of the other beam half at one of at least two distinct relative positions separated along a horizontal transverse axis, the mating surfaces of both beam halves having each at least one fixation feature for fixation of the mating surface to the mating surface of the other beam half; and wherein the internal extremity of each beam half has a first abutment portion configured for abutment against a second abutment portion of the other beam half, the first and second abutment portions being configured to block relative movement of each beam half internal extremity relative to the external extremity of the beam half to which said beam half internal extremity pertains.

2. The transverse cross-member beam of claim 1, wherein the first abutment portion of one beam half and the second abutment portion of the other beam half have a corresponding male/female geometry, and wherein the male geometry is received within the female geometry.

3. The transverse cross-member beam of claim 2, wherein the male/female geometries of the first abutment portion of one beam half and the second abutment portion of the other beam half are configured to allow introduction of the male geometry into the female geometry along a longitudinal direction.

4. The transverse cross-member beam of claim 1, wherein the mating surfaces of each beam half overlap each other when viewed along a longitudinal axis.

5. The transverse cross-member beam of claim 1, wherein the mating surface of each beam half extends along a vertical and transverse plane.

6. The transverse cross-member beam of claim 1, wherein the beam forms an arch, where the external extremity of each beam half is located vertically lower than the internal extremity of each beam half.

7. The transverse cross-member beam of claim 1, wherein the first and second beam halves are assembled opposite one to the other to form the cross-member beam.

8. The transverse cross-member beam of claim 1, wherein each beam half external extremity is configured for connection to the corresponding longitudinal frame member via a mounting bracket, and wherein the external extremity of each beam half has a bracket interface portion having at least one downwardly oriented bracket contact surface defining a downward bracket contact direction, the downward bracket contact direction being downwardly oriented in a vertical and transverse plane.

9. A mounting bracket for mounting a transverse cross-member beam between two longitudinal and horizontal frame members of a vehicle chassis, comprising:

a frame interface portion having at least three non-linear frame contact locations which are configured for contacting one of the two frame members and which each comprise a distinct frame fixation feature, and wherein the frame contact locations define a vertical and longitudinal frame contact plane perpendicular to a horizontal transverse axis; and a beam interface portion having at least one upwardly oriented beam contact surface, configured for contacting one extremity of the transverse cross-member beam, and defining an upward beam contact direction, and wherein the upward beam contact direction is upwardly oriented in a vertical and transverse plane;

wherein the frame interface portion has a concave longitudinal recess in its external surface turned towards the longitudinal frame member on which the mounting bracket is to be affixed, the concave longitudinal recess being open in the frame contact plane and extending longitudinally so as to be open at the longitudinal extremities of the mounting bracket.

10. The mounting bracket of claim 9, wherein the beam interface portion comprises at least one beam positioning feature, and wherein, preferably, the beam positioning feature is a beam positioning and fixation feature, and wherein the beam positioning and fixation feature preferably comprises a threaded stud.

11. A transverse cross-member assembly comprising a transverse cross-member beam according to claim 1 and two mounting brackets each for mounting a transverse cross-member beam between two longitudinal and horizontal frame members of a vehicle chassis;

each of the two mounting brackets comprising:

a frame interface portion having at least three non-linear frame contact locations which are configured for contacting one of the two frame members and which each comprise a distinct frame fixation feature, and wherein the frame contact locations define a vertical and longitudinal frame contact plane perpendicular to a horizontal transverse axis; and a beam interface portion having at least one upwardly oriented beam contact surface, configured for contacting one extremity of the transverse cross-member beam, and defining an upward beam contact direction, and wherein the upward beam contact direction is upwardly oriented in a vertical and transverse plane;

wherein the two mounting brackets are configured for being fixed each by their beam interface portion to the external extremity of one of the two beam halves.

12. The transverse cross-member assembly of claim 11, wherein the beam interface portion comprises at least one beam positioning feature, and wherein, preferably, the beam positioning feature is a beam positioning and fixation feature, and wherein the beam positioning and fixation feature preferably comprises a threaded stud.

13. The transverse cross-member assembly of claim 11, wherein the frame interface portion has a concave longitudinal recess in its external surface turned towards the longitudinal frame member on which the mounting bracket is to be affixed, the concave longitudinal recess being open in the frame contact plane and extending longitudinally so as to be open at the longitudinal extremities of the mounting bracket.

14. A vehicle comprising a chassis having two longitudinal and horizontal frame members, the vehicle further comprising a transverse cross-member beam according to claim 1 and two mounting brackets each for mounting a transverse cross-member beam between two longitudinal and horizontal frame members of a vehicle chassis;

each of the two mounting brackets comprising:

a frame interface portion having at least three non-linear frame contact locations which are configured for contacting one of the two frame members and which each comprise a distinct frame fixation feature, and wherein the frame contact locations define a vertical and longitudinal frame contact plane perpendicular to a horizontal transverse axis; and a beam interface portion having at least one upwardly oriented beam contact surface, configured for contacting one extremity of the transverse cross-member beam, and defining an upward beam contact direction, and wherein the upward beam contact direction is upwardly oriented in a vertical and transverse plane.

15. The vehicle of claim 14, wherein the beam interface portion comprises at least one beam positioning feature, and wherein, preferably, the beam positioning feature is a beam positioning and fixation feature, and wherein the beam positioning and fixation feature preferably comprises a threaded stud.

16. The vehicle of claim 14, wherein the frame interface portion has a concave longitudinal recess in its external surface turned towards the longitudinal frame member on which the mounting bracket is to be affixed, the concave longitudinal recess being open in the frame contact plane and extending longitudinally so as to be open at the longitudinal extremities of the mounting bracket.

17. A method for mounting the transverse cross-member assembly of claim 11 into a ladder frame, comprising:

a first phase which includes, in whichever order:

mounting a first mounting bracket on a first longitudinal frame member;

mounting a first beam half on the first mounting bracket; and mounting a second mounting bracket on a second longitudinal frame member;

a second phase, posterior to the first phase, which includes, in whichever order:

positioning the second beam half external extremity on the second mounting bracket; and positioning the second beam half internal extremity in contact with the internal extremity of the first beam half in such a way that the first abutment portion of one of the beam halves abuts against the second abutment portion of the other beam half; and a third phase, posterior to the second phase, which includes, in whichever order:

fastening the second beam half external extremity on the second mounting bracket; and fastening the second beam half internal extremity with the internal extremity of the first beam half.

18. A method for assembling a vehicle, comprising:

connecting two longitudinal frame members by at least two primary transverse cross-members to form a ladder frame of the vehicle;

mounting one or several vehicle components selected in the list of powertrain components, and/or driveline components, and/or suspension components and/or steering components onto the ladder frame; and subsequently to the mounting of one or several vehicle components, mounting the transverse cross-member assembly of claim 11 into the ladder frame.

* * * * *